INVENTORS
V. KRUCHOWY
F. WAHL
By A. J. Nugent
ATTORNEY

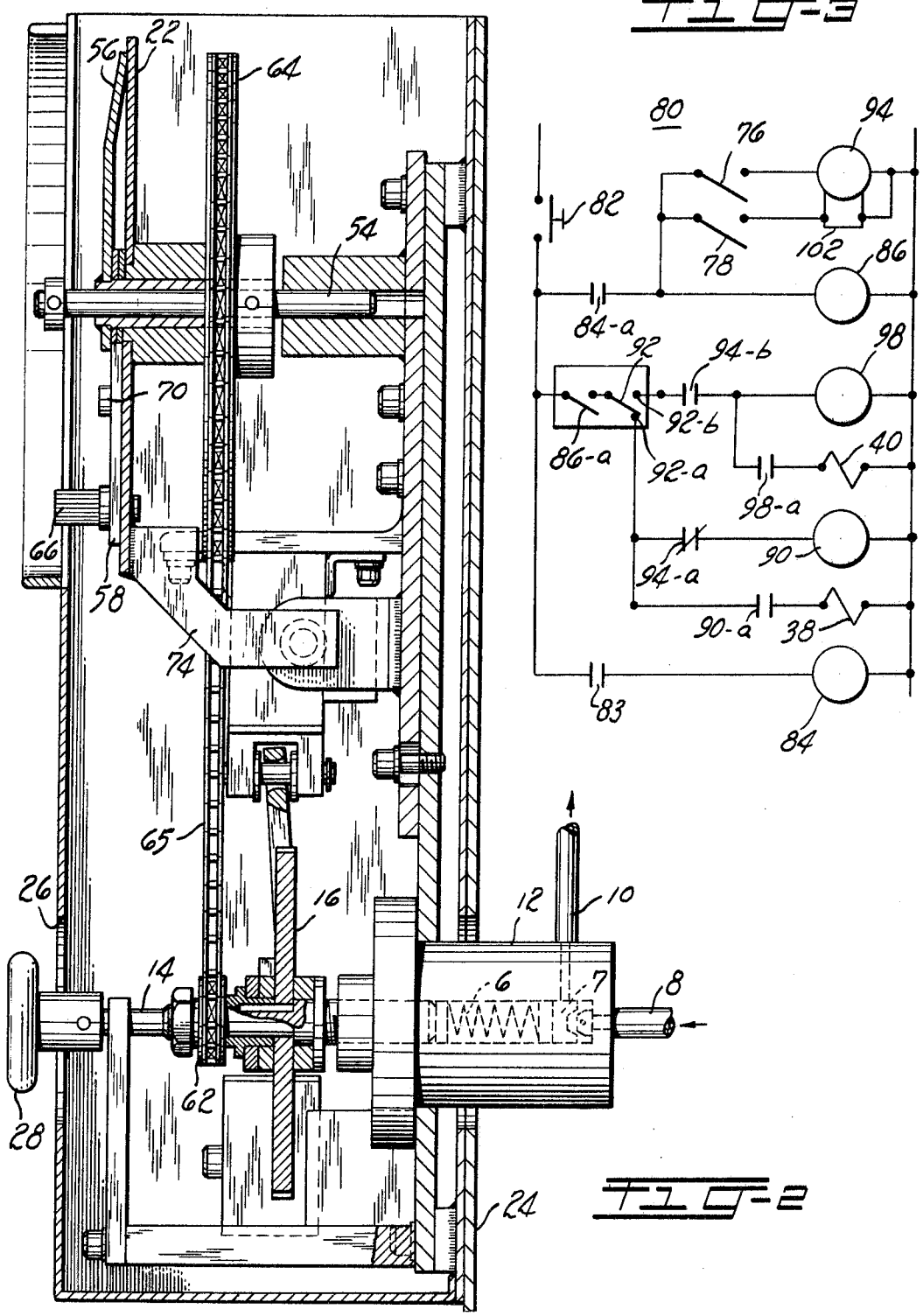

United States Patent Office 3,508,464
Patented Apr. 28, 1970

3,508,464
PRESSURE CONTROL APPARATUS
Vincent Kruchowy, Westfield, and Frank Wahl, North Bergen, N.J., assignors to Western Electric Company, Incorporated, New York, N.Y., a corporation of New York
Filed Nov. 4, 1966, Ser. No. 611,186
Int. Cl. F01b *31/12;* F15b *21/02;* G05b *19/00*
U.S. Cl. 91—1                                6 Claims

ABSTRACT OF THE DISCLOSURE

Pressure applied during a molding cycle is controlled to rise gradually to a maximum value, hold at that value and then be reduced gradually to a minimum value. A pressure control valve driven by a solenoid and pawl mechanism has adjustable pressure limit actuators and adjustable timers for pre-setting the maximum and minimum pressures and the rates of change of pressure.

---

This invention relates to pressure control apparatus and particularly to apparatus for regulating the pressure applied to a plastic material during a hydraulic molding press cycle.

Thermoplastic molding materials are widely used in the manufacture of electrical apparatus used in the communications field. More particularly, such materials are utilized as seals for apparatus which experience extreme operating conditions such as submarine cable repeaters used in undersea cables. The seals which are positioned at the input and output ends of each repeater for connection to an undersea cable must meet critical temperature, pressure and time requirements during manufacture. Thus, the fabrication of the seals in a molding press must be carefully controlled. While molding presses are commercially available with a variety of manual and static control features, the present invention enables the operator to program a variable time-pressure molding cycle to perform an automatic molding operation.

Accordingly, it is an object of this invention to provide a new and improved pressure control apparatus.

Another object of this invention is to provide a pressure control apparatus for automatically regulating the pressure applied by a press during a molding operation.

A more specific object of this invention is to provide a control apparatus for automatically increasing the molding pressure applied by a press at a uniform adjustable rate up to a predetermined value, maintaining the pressure for a set interval and then decreasing the pressure at a uniform rate to a predetermined value.

In accordance with the above and other objects and advantages, the present invention relates to a pressure control system for a molding press which produces plastic molded parts. The invention comprises an adjustable valve for controlling the pressure exerted on the plastic material in the molding press. The valve is controlled by timer controlled means operatively connected to the valve for driving the valve in a first direction to increase the pressure exerted on the material at a uniform rate to a predetermined maximum value, timing means for causing the maintenance of the maximum pressure for an adjustable time interval, and timer controlled means for driving the valve in the opposite direction to decrease the pressure at a uniform rate to a predetermined minimum value.

Other objects and advantages of the present invention will become more apparent when considering the following detailed description and the drawings wherein:

FIG. 2 shows a side view of the apparatus; and

FIG. 3 shows a schematic electrical circuit for controlling the pressure.

Figure 1:
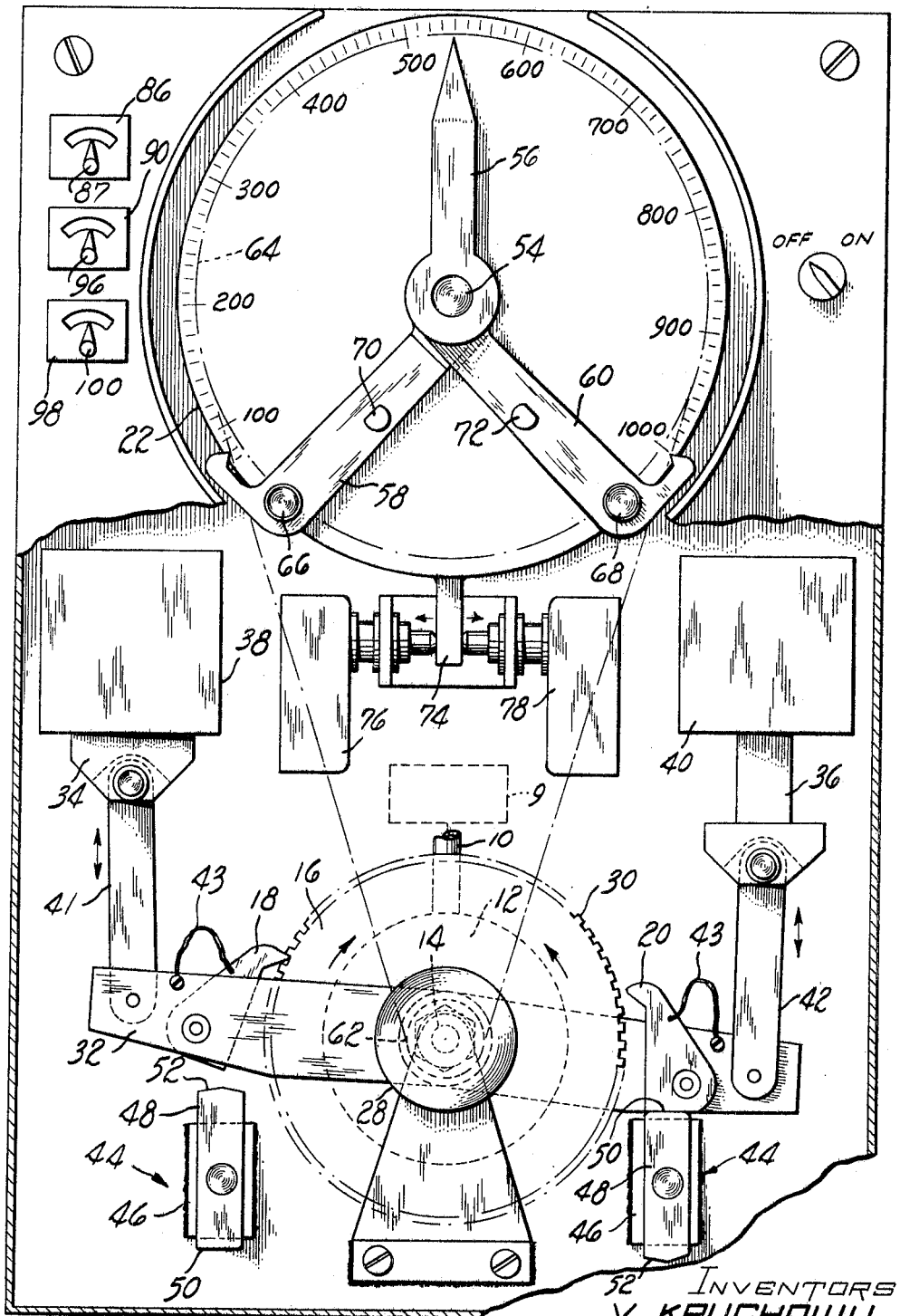
FIG. 1 shows a front view of the pressure control apparatus comprising the invention.

Referring now to the drawings, the invention includes a hydraulic molding press 9, shown schematically, a hydraulic fluid line 10 for operating the press, a cylindrical valve 12 mounted in the hydraulic fluid line and having a rotatable stem 14, the angular displacement of the stem controlling the fluid flow in fluid line 10, and therefore the pressure in the hydraulic press. The valve is coupled to a line 8 through which oil is pumped. Rotational movement in either direction may be automatically imparted to the rotatable stem 14 by means of an indexable disc 16 mounted thereon and two solenoid operated pawls 18 and 20, mounted on opposite sides of disc 16. A timer circuit 80 (FIG. 3) controls the operation of the solenoids in conjunction with a pressure dial 22 and microswitches 76, 78 associated therewith which set upper and lower pressure limits.

The invention permits an automatic molding operation under variable time-pressure conditions to produce a plastic part, such as a submarine cable repeater seal, which is satisfactory under extreme environmental conditions. In a typical work cycle, the pressure control apparatus increases the pressure exerted on the thermoplastic material at a uniform rate to a predetermined maximum value, maintains the pressure for an adjustable time interval and then decreases the pressure at a uniform rate to a predetermined minimum value. The various pressure limits may be adjusted and the time intervals are determined by the timers in the timer circuit.

With particular reference to FIG. 2, valve 12 is mounted on a frame 24 and includes a reciprocable valve element 7 mounted therein. The reciprocal motion of the element 7, and therefore the lateral displacement thereof within the cylindrical valve, is controlled by rotational movement of valve stem 14 which is coupled to the element 7 through spring 6 and extends therefrom through an aperture 26 in the frame. A rotatable handle 28 is mounted to the end of the stem for manual pressure adjustment. As viewed in FIG. 1, clockwise rotation of stem 14 will cause an increase in the pressure in the hydraulic press, and counterclockwise rotation will cause a decrease in the pressure.

As stated above, rotational movement is automatically imparted to valve stem 14 through indexable disc 16 which is fixed mounted thereto and includes a plurality of teeth 30 equidistantly spaced about the periphery thereof. Pawls 18 and 20, which are operable to be moved into engagement with teeth 30 to index disc 16, are pivotally mounted for this purpose on a member 32 which is rotatably mounted on valve stem 14. The extremities of member 32 are pivotally connected to the armatures 34 and 36 of the two solenoids designated 38 and 40 respectively by linkage members 41 and 42 respectively. Each pawl is urged toward disc 16 by spring means 43 such that, when a solenoid is energized and its armature retracts to rotate member 32, the corresponding pawl is pivoted into engagement with the toothed periphery of disc 28 to index it.

An adjustable stop 44 is mounted beneath member 36 in spaced relationship with each pawl. Each stop includes a mounting block 46 and a stop member 48 rotatably mounted thereto. Each stop member 48 is rotatable on its mounting block between two positions so that it may selectively present two different surfaces 50 and 52, to the bottom of the pawl. As shown in FIG. 1, each stop member is pivotally mounted on its mounting block so that surfaces 50 and 52 are disposed at different heights when rotated into position. When surface 50 is in position, as shown on the right side of FIG. 1, disc 16 will be indexed a distance equal to one tooth upon energization of a solenoid, and when surface 52 is in position, as shown on the left side of FIG. 1, disc 16 will be indexed a distance equal to two teeth upon energization of a solenoid.

Pressure indicating dial 22 is rotatably mounted on a shaft 54 (FIG. 2) which is mounted in turn on frame 24 in spaced relationship with respect to the valve stem 14. The dial includes a pressure indicator 56 and upper and lower pressure limit pointers 58 and 60. Pressure indicating dial 22 is calibrated such that it accurately represents the pressure within the hydraulic press. More specifically, a sprocket 62 is fixedly mounted on valve stem 14 and a sprocket 64 is fixedly mounted to shaft 54 in spaced relationship to sprocket 62, and a chain 65 interconnects the sprockets 62 and 64. Pressure indicator 56 is fixedly mounted on shaft 54 so that it will rotate along with sprocket 64 in a one-to-one relationship. As stated above, pressure indicating dial 22 is rotatably mounted on shaft 54. However, it is mounted to a bearing-spacer 66 which is rotatably mounted to shaft 54 so that the dial 22 will remain stationary when shaft 54 is rotated by sprocket 64, rotating pressure indicator 56.

Pressure limit pointers 58 and 60 are rotatably mounted on shaft 54. The pressure limit pointers 58, 60 include pins 66 and 68 respectively, threadedly mounted at the extremities thereof such that the angular position of each pressure limit pointer along the dial may be fixed by threading the pin inwardly until it engages the face of the dial. Each pressure limit pointer also includes a pin, 70 and 72 respectively, mounted along the length thereof, each pin extending away from the face of the dial so that it will be in the path of pressure indicator 56 as it rotates.

Pressure indicating dial 22 includes an actuating member 74 fixedly attached to the lower portion thereof. A pair of microswitches, 76 and 78 respectively are mounted in spaced relationship with actuating member 74 on either side thereof as shown in FIG. 1. In operation, as the pressure indicator 56 rotates along the dial, it will strike either pin 70 or 72, depending on its direction of rotation, and thus rotate dial 22, causing actuating member 74 to energize either microswitch 76 or microswitch 78, depending upon the direction of rotation. As disclosed in detail hereinbelow, microswitches 76 and 78 are part of the timing circuit. In conjunction with pressure limit pointers 58 and 60, the microswitches define the maximum and final pressures developed in the hydraulic press. And, since pressure limit pointers 58 and 60 may be set at any desired value by manually moving them along dial 22 and then fixing them at the desired value manually by rotating the threaded pins 66 and 68 inwardly, the maximum and final hydraulic press pressures may be fixed as desired.

In electrical circuit 80 (FIG. 3), a cycle is initiated by closing switch 82. When the temperature of the plastic within the hydraulic press has reached a predetermined level sensing probes contact 83 causes energization of a relay 84 which closes normally open contact 84–a which activates a first timer 86. Timer 86 sets the time at which the pressure-down cycle commences, which time is readily adjustable by manipulating an adjusting knob 87 (FIG. 1) associated therewith. Activation of timer 86 closes normally open switch 86–a, energizing a second timer 90 through a switch 92, which normally engages its contact 92–a, and normally closed contact 94–a of a relay 94. Activation of timer 90 closes normally open contact 90–a, thereby energizing solenoid 38. Timer 90 includes a pulsing circuit such that solenoid 38 is activated and de-activated in a repetitive manner. Each time solenoid 38 is activated, it retracts its armature 34, causing the rotation of member 32 and forcing pawl 18 into engagement with the toothed periphery of disc 16. This indexes the disc an incremental distance clockwise, rotating valve stem 14 a corresponding amount, and thereby raising the pressure in the hydraulic press. This rise in pressure will be indicated by rotation of pressure indicator 56 clockwise.

The period of time between pulses of timer 90, and therefore solenoid 38, may be controlled by manipulation of an adjusting knob 96 associated therewith (FIG. 1). Accordingly, the time it takes for the pressure within the hydraulic press to be increased to a predetermined maximum level, which is determined by setting pressure limit pointer 60, may be controlled. In addition, it may be controlled by adjusting the angular displacement of each indexing movement of disc 28 by rotating the stop member 48 on its mounting block 46 as described hereinabove.

As timer 90 causes solenoid 38 to increase the pressure in the press, pressure indicator 56 rotates in a clockwise direction along dial 22 until it strikes pin 72 mounted on pressure limit pointer 60. An incremental rotation of pressure indicator 56 while it is in contact with pin 72 causes a slight rotational movement of dial 22, which activates microswitch 76, energizing relay 94. The energization of relay 94 closes normally open contact 94–b and opens normally closed contact 94–a. The opening of normally closed contact 94–a de-activates timer 90, opening contact 90–a and de-energizing solenoid 38. The closing of normally open contact 94–b prepares the circuit for energization of a third timer, 98. However, timer 98 will not be energized until timer 86 times out, moving switch 92 from contact 92–a to contact 92–b.

As stated hereinabove, the time associated with timer 86 is readily adjustable, and since neither timer 90 nor timer 98 are energized at this stage of the cycle, the length of time that the hydraulic press is maintained at its predetermined maximum pressure is also readily adjustable.

When timer 86 times out, switch 92 will move to contact 92–b, energizing timer 98 which is similar in structure and function to timer 90. Therefore, energization of timer 98 closes contact 98–a, energizing solenoid 40 and commencing a pulsing downward pressure cycle of adjustable duration, the duration being controlled by a control knob 100 on timer 98, and the position of the stop member beneath pawl 20. As the pressure starts its downward cycle, microswitch 76 is de-energized since pointer 56 moves away from pressure limit pointer 58, allowing dial 22 to rotate back to its normal position. However, relay 94 remains energized until de-energized positively as described hereinbelow. Timer 98 and solenoid 40, by operation of pawl 20, will cause the pressure in the hydraulic press to be driven downwardly until pressure indicator 56 strikes pin 70 on pressure limit pointer 58. When pressure indicator 56 strikes pin 70 it will rotate dial 22 in a counterclockwise direction causing actuating member 74 to activate microswitch 78. Closure of microswitch 78 de-energizes relay 94, through latch 102 causing contact 94–b to open and contact 94–a to close. The opening of contact 94–b de-energizes timer 98, opening contact 98–a and thereby shutting off solenoid 40. And, when the temperature in the hydraulic press falls below the above-mentioned predetermined value, timer 86 will be de-energized, opening switch 86–a and moving switch 92 to contact 92–a, thus returning the system to its starting position.

A hydraulic molding press operates in a cycle which includes the steps of increasing the pressure therein to a maximum value, maintaining the pressure at the maximum value for a predetermined length of time, and then decreasing the pressure therein to a minimum value. The instant invention allows the maximum and minimum pressures be set at any desired value, the duration of each sub-cycle, i.e., increase, dwell, decrease, to be automatically controlled, and the rate of increase or decrease to be controlled. Therefore, the molding cycle may be varied widely to suit the material, size, shape, etc., of the part being molded, which results in obvious advantages.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for controlling the operation of a hydraulic press having a hydraulic fluid feed line connected thereto, which comprises:

control valve means mounted in the hydraulic feed line to control the pressure exerted by the hydraulic press, driving means operable to engage the valve means and drive it in a first direction to increase the pressure exerted by said press, a dial having a face calibrated in units of pressure, a pressure indicator connected to said dial and movable therealong, said pressure indicator being operatively connected to said control valve so as to accurately portray on the dial the pressure being exerted by the press, an actuating member mounted on said dial, limit switch means mounted adjacent said actuating member and coupled to said first driving means, said limit switch means being operable upon the actuation thereof, to de-activate the driving means, and means for causing the actuating member to actuate the limit switch means when the pressure indicator reaches a predetermined pressure value on said dial.

2. Apparatus for controlling the operation of a hydraulic press having a hydraulic fluid feed line connected thereto, according to claim 1 further comprising:

timer means operable to cause the hydraulic press to continue exerting said predetermined pressure for a predetermined period of time, second driving means operable to engage the control valve means to drive it in a second direction to decrease the pressure exerted by the hydraulic press, and means responsive to said timer means for activating said second driving means after the expiration of said predetermined period of time.

3. Apparatus for controlling the operation of a hydraulic press having a hydraulic fluid feed line connected thereto, which comprises:

control valve means mounted in the hydraulic feed line to control the pressure exerted by the hydraulic press, driving means operable to engage the valve means and drive it in a first direction to increase the pressure exerted by said press, a dial having a face calibrated in units of pressure, said dial being rotatable about its own axis, a pressure indicator connected to said dial and movable therealong, said pressure indicator being operatively connected to said control valve so as to accurately portray on the dial the pressure being exerted by the press, an actuating member mounted on said dial, limit switch means mounted adjacent said actuating member and coupled to said first driving means, said limit switch means being operable, upon the actuation thereof, to de-activate the driving means, and means for rotating said dial when the pressure within the press reaches a predetermined pressure value said dial rotation causing said actuating member into engagement with the limit switch means to actuate the latter.

4. Apparatus for controlling the operation of a hydraulic press according to claim 3, wherein the means for rotating the dial comprises:

a pointer connected to said dial and freely movabble therealong, means for selectively fixing the position of the pointer along the face of the dial at a desired pressure magnitude, at least a portion of said pointer being in the same plane as said pressure indicator, wherein the pressure indicator is operable to engage the pointer when the pressure exerted by the press reaches said desired magnitude, and an incremental further increase in the pressure exerted by the press being operable to cause the pressure indicator to rotate the dial about its axis.

5. Apparatus for controlling the operation of a hydraulic press, according to claim 4, further comprising:

timer means operable to cause the hydraulic press to continue exerting said predetermined value for a predetermined period of time, second driving means operable to engage the control valve means and drive it in a second direction to decrease the pressure exerted by the hydraulic press, and means responsive to said timer means for activating said second driving means after the expiration of said predetermined period of time.

6. Apparatus for controlling the operation of a hydraulic press having a hydraulic fluid feed line connected thereto, which comprises:

a control valve mounted in the hydraulic feed line, said control valve including a rotatable stem, the angular displacement of said valve stem controlling the pressure in the hydraulic press, an indexable disc fixedly mounted to said valve stem, first solenoid operated pawl means operable to engage the indexable disc and drive it in a first direction to cause the control valve to increase the pressure exerted by said press, a dial having a face calibrated in units of pressure, said dial being rotatable about its own axis, a pressure indicator connected to said dial and movable therealong, said pressure indicator being operatively connected to said valve stem so as to accurately represent the pressure being exerted by the press, an actuating member mounted on said dial, first limit switch means mounted adjacent said actuating member and coupled to said first driving means, said first limit switch means being operable, upon the actuation thereof, to de-activate the solenoid of said first solenoid operated pawl means, a first pointer connected to said dial and freely movable therealong, means for selectively fixing the position of said first pointer along the face of the dial at a first desired pressure magnitude, at least a portion of said first pointer being in the same plane as said pressure indicator, wherein the pressure indicator is operable to engage said first pointer when the pressure exerted by the press reaches said first desired magnitude, and an incremental further increase in the pressure exerted bby the press being operable to cause the pressure indicator to rotate the dial in a first direction about its axis, said dial rotation causing the actuating member to engage and activate the first limit switch means, timer means operable to cause the hydraulic press to continue exerting said first desired pressure for a predetermined period of time, second solenoid operated pawl means operable to engage the indexable disc means to drive it in a second direction to cause the control valve to decrease the pressure exerted by the hydraulic press, means responsive to said timer means for activating said second driving means after the expiration of said predetermined period of time, second limit switch means mounted adjacent said actuating member and coupled to said second driving means, said second limit switch means being operable, upon the actuation thereof, to de-activate said second driving means, second pointer connected to said dial and freely movable therealong, means for selectively fixing the position of said second pointer along the face of the dial at a second desired pressure magnitude, said second desired pressure magnitude being lower than the first desired pressure magnitude.

at least a portion of said second pointer being in he same plane as said pressure indicator, wherein the pressure indicator is operable to engage said second pointer when the pressure exerted by the press reaches said second desired magnitude, and an incremental further decrease in the pressure exerted by the press being operable to cause the pressure indicator to rotate the dial in a second direction about its axis, said dial rotation causing the actuating member to engage and activate the second limit switch means.

References Cited

UNITED STATES PATENTS

| | | | |
|---|---|---|---|
| 1,898,147 | 2/1933 | Smith | 137—556.3 |
| 2,127,265 | 8/1938 | Martin | 91—39 |
| 2,329,686 | 9/1943 | Bernard | 74—143 |
| 2,367,242 | 1/1945 | Stacy. | |
| 2,674,230 | 4/1954 | Green. | |
| 2,801,442 | 8/1957 | Moslo. | |
| 1,426,718 | 8/1922 | De Florez | 251—230 X |
| 1,437,626 | 12/1922 | Wilson | 251—230 X |
| 2,064,053 | 12/1936 | Balzer et al. | 137—624.18 X |
| 2,857,964 | 10/1958 | Vore | 137—624.2 |

FOREIGN PATENTS 363,560   8/1906   France.

MARTIN P. SCHWADRON, Primary Examiner

I. C. COHEN, Assistant Examiner

U.S. Cl. X.R.

91—35; 137—557, 624.11; 251—230